United States Patent
Yuasa et al.

(10) Patent No.: US 11,338,473 B2
(45) Date of Patent: May 24, 2022

(54) FILAMENT, STRUCTURAL BODY, AND METHOD FOR MANUFACTURING SAME

(71) Applicant: KYORAKU CO., LTD., Kyoto (JP)

(72) Inventors: Ryohei Yuasa, Yamato (JP); Takashi Nomura, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 173 days.

(21) Appl. No.: 16/760,993

(22) PCT Filed: Nov. 2, 2018

(86) PCT No.: PCT/JP2018/040857
§ 371 (c)(1),
(2) Date: May 1, 2020

(87) PCT Pub. No.: WO2019/093241
PCT Pub. Date: May 16, 2019

(65) Prior Publication Data
US 2021/0170633 A1    Jun. 10, 2021

(30) Foreign Application Priority Data
Nov. 8, 2017 (JP) .............................. JP2017-215512

(51) Int. Cl.
| | | |
|---|---|---|
| *B29B 11/10* | (2006.01) |
| *B29B 15/12* | (2006.01) |
| *B33Y 10/00* | (2015.01) |
| *B33Y 70/10* | (2020.01) |
| *B29C 64/118* | (2017.01) |
| *D01D 5/34* | (2006.01) |
| *D01F 8/04* | (2006.01) |

(52) U.S. Cl.
CPC ............ *B29B 11/10* (2013.01); *B29B 15/122* (2013.01); *B29C 64/118* (2017.08); *B33Y 10/00* (2014.12); *B33Y 70/10* (2020.01); *D01D 5/34* (2013.01); *D01F 8/04* (2013.01)

(58) Field of Classification Search
None
See application file for complete search history.

(56) References Cited

U.S. PATENT DOCUMENTS

| | | |
|---|---|---|
| 9,126,365 B1 | 9/2015 | Mark et al. |
| 2014/0134335 A1 | 5/2014 | Pridoehl et al. |
| 2015/0321424 A1 | 11/2015 | Pridoehl et al. |
| 2016/0012935 A1 | 1/2016 | Rothfuss |

(Continued)

FOREIGN PATENT DOCUMENTS

| | | |
|---|---|---|
| JP | H01-272822 A | 10/1989 |
| JP | H05-320366 A | 12/1993 |

(Continued)

OTHER PUBLICATIONS

International Search Report dated Dec. 11, 2018 in corresponding International Application No. PCT/JP2018/040857; 4 pages.

(Continued)

*Primary Examiner* — Robert J Grun
(74) *Attorney, Agent, or Firm* — Maier & Maier, PLLC

(57) ABSTRACT

A filament can enable an arbitrary material to exhibit shape memory characteristics. A filament includes a linear core; and a covering layer covering the core; wherein: the core is formed with a shape memory material; and the covering layer is formed with a material different from the material of the core.

6 Claims, 6 Drawing Sheets

(56) References Cited

U.S. PATENT DOCUMENTS

| | | |
|---|---|---|
| 2017/0066187 A1 | 3/2017 | Mark et al. |
| 2018/0093413 A1 | 4/2018 | Yuasa et al. |
| 2018/0272599 A1 | 9/2018 | Rodriguez et al. |
| 2019/0337282 A1 | 11/2019 | Pridoehl et al. |

FOREIGN PATENT DOCUMENTS

| | | |
|---|---|---|
| JP | 2016-501137 A | 1/2016 |
| JP | 2016-518267 A | 6/2016 |
| JP | 2016-193601 A | 11/2016 |
| WO | 2017/078987 A1 | 5/2017 |

OTHER PUBLICATIONS

Yang, Yang et al., "3D printing of shape memory polymer for functional part fabrication", The International Journal of Advanced Manufacturing Technology, Sep. 24, 2015, vol. 84, pp. 2079-2095.
Extended European Search Report dated Nov. 26, 2020, in connection with corresponding EP Application No. 18876024.3; 9 pages.

FILAMENT, STRUCTURAL BODY, AND METHOD FOR MANUFACTURING SAME

TECHNICAL FIELD

The present invention relates to a filament, a structural body, and to a method for manufacturing thereof.

BACKGROUND

Patent Literature 1 discloses a shape memory molded body which uses an urethane elastomer of which glass transition temperature is adjusted to a temperature range near the working temperature. As an example of the shape memory molded body, plaster cast and the like are mentioned.

CITATION LIST

Patent Literature

[Patent Literature 1] JP H05-320366A

SUMMARY OF THE INVENTION

Technical Problem

In Patent Literature 1, urethane elastomer itself is used as the material of the plaster cast, and thus other material cannot be used.

The present invention has been made by taking the afore-mentioned circumstances into consideration. The present invention provides a filament which can enable an arbitrary material to exhibit shape memory characteristics.

Solution to Problem

According to the present invention, a filament, comprising: a linear core; and a covering layer covering the core; wherein: the core is formed with a shape memory material; and the covering layer is formed with a material different from the material of the core, is provided.

The present inventors have found that when a shaping pattern to change the shape of an adherend is formed by using a filament formed with a shape memory material, an adherend of arbitrary material can exhibit shape memory characteristics. On the other hand, the inventors have found a problem that when the welding characteristics between the shape memory material and the adherend is not superior, it is difficult to weld the filament to the adherend. Further, the inventors have found that when a filament structured by covering a core formed with a shape memory material with a covering layer is used, the welding characteristics between an adherend of arbitrary material and a filament can be improved by selecting a material having superior welding characteristics with the adherend as the material of the covering layer, thereby leading to completion of the invention. By using the filament of the present invention to form the shaping pattern on the adherend for changing the shape of the adherend, arbitrary adherend can exhibit a shape memory characteristics.

Hereinafter, various embodiments of the present invention will be described. The embodiments shown hereinafter can be combined with each other.

Preferably, the material of the core is a shape memory polymer; and the material of the covering layer is a thermoplastic resin.

Preferably, the structural body, comprises: an adherend; and a shaping pattern to change a shape of the adherend; wherein: the shaping pattern is formed with the filament above; and the covering layer of the filament is welded to the adherend.

Preferably, in the structural body, the material of the covering layer is a material which is more easily welded to the adherend than to the material of the core.

Preferably, in the structural body, when SP value of a material of a surface of the adherend is taken as SPbase, SP value of a material of the covering layer is taken as SPcover, and SP value of a material of the core is taken as SPcore; and when $\Delta SPcover$ and $\Delta SPcore$ are defined by formulas (1) and (2), relation of formula (3) is satisfied.

$$\Delta SPcover = |SPcover - SPbase| \quad (1)$$

$$\Delta SPcore = |SPcore - SPbase| \quad (2)$$

$$\Delta SPcover < \Delta SPcore \quad (3)$$

Preferably, in the structural body, a relation of formula (4) is satisfied.

$$\Delta SPcover \leq 1.3 \quad (4)$$

Preferably, a method for manufacturing a structural body using a thermofusion 3D printer comprises the steps of: a shaping pattern forming step to form a shaping pattern to change a shape of an adherend; wherein: in the shaping pattern forming step, a covering layer and a core are melt extruded from a head so that the covering layer covers the core, and the covering layer is welded to the adherend to form the shaping pattern; the core is formed with a shape memory polymer; and the covering layer is formed with a thermoplastic resin other than a material of the core.

Preferably, in the shaping pattern forming step, the filament of claim 2 is inserted into the head, and the filament is melt extruded from the head in a condition where the covering layer is covering the core.

MODE FOR CARRYING OUT THE INVENTION

Hereinafter, various embodiments of the present invention will be described. Various distinctive features shown in the following embodiments can be combined with each other. In addition, an invention can be established independently for each of the distinctive features.

1. Constitution and Manufacturing Method of Filament 1

Figure 1:
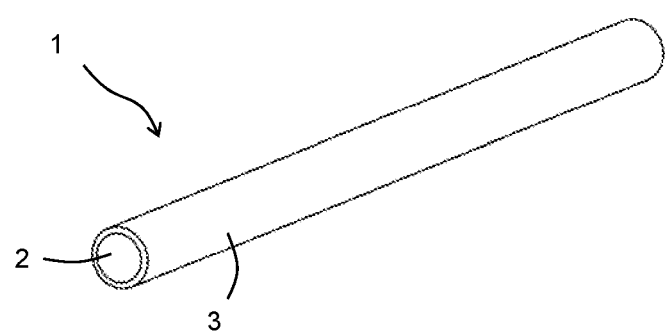
FIG. 1 shows a perspective view of filament 1 according to an embodiment of the present invention.

As shown in FIG. 1, filament 1 according to an embodiment of the present invention comprises a linear core 2, and a covering layer 3 covering the core 2. Since the core 2 is linear, the filament 1 is also linear.

The core 2 is formed with a shape memory material. The shape memory material is a material having shape memory characteristics, and is constituted with alloy, polymer, and the like. Here, shape memory characteristics is a characteristics which allows a material to recover its original form by elasticity when heated to a temperature above a predetermined recovery temperature. Recovery temperature is a temperature defined by the material, and is, for example, 0 to 100° C., preferably 25 to 80° C. Specific example of recovery temperature is 0, 5, 10, 15, 20, 25, 30, 35, 40, 45, 50, 55, 60, 65, 70, 75, 80, 85, 90, 95, or 100° C., and can be in the range between the two values exemplified herein.

When the shape memory material is a shape memory alloy, the recovery temperature is a transformation temperature. When the shape of the shape memory alloy is changed from its original form to a secondary shape at a temperature below the transformation temperature, the secondary shape is maintained at a temperature below the transformation temperature, and the original form is recovered by elasticity when the shape memory alloy is heated to a temperature at or above the transformation temperature. The original form can be set by performing heat treatment (for example, heat treatment at 400 to 500° C.) in a condition where the shape memory alloy is fixed in a desired shape. As the shape memory alloy, NiTi alloy can be mentioned.

When the shape memory material is a shape memory polymer, the recovery temperature is the glass transition temperature (Tg). When the shape memory polymer is shaped into a secondary shape by applying external force at a temperature of Tg or higher, followed by cooling to a temperature below Tg while maintaining the external force, the secondary shape is fixed. At a temperature below Tg, the original form is not recovered even when the external force is removed. On the other hand, when the shape memory polymer with the secondary shape is heated to a temperature of Tg or higher without the external force being applied, the original form is recovered by elasticity. The original form can be set by melting the shape memory polymer and forming the shape memory polymer into a desired shape. As the shape memory polymer, polymer having rubber elasticity can be mentioned, such as poly norbornene, trans poly isoprene, styrene-butadiene copolymer, and polyurethane.

The covering layer 3 is formed with a material other than the material of the core 2. The material of the covering layer 3 is not particularly limited, and polyolefin such as polyethylene and polypropylene, polyester such as PET, and polyurethane can be mentioned.

As the material of covering layer 3, a material having high compatibility with adherend 4 (refer to FIG. 2) to which the filament 1 is welded is preferable. In such case, regardless of the material of core 2, the filament 1 can be welded on the adherend 4. For example, when the adherend 4 is formed with PET, and the core 2 is polyurethane, PET is selected as the material of the covering layer 3. In such case, the welding characteristics between the adherend 4 and the covering layer 3 becomes extremely superior.

The diameter of the filament 1 is, for example, 0.5 to 3 mm, and is preferably 1.75 to 3 mm. Specific example of the diameter of the filament 1 is, 0.5, 1, 1.5, 1.75, 2, 2.5, or 3 mm, and can be in the range between the two values exemplified herein. When the radius of the filament 1 is taken as Rfil, and the radius of the core 2 is taken as Rcore, the value of Rcore/Rfil is preferably in the range of 0.6 to 0.99, and more preferably in the range of 0.8 to 0.95. Specific example of the value of Rcore/Rfil is, 0.6, 0.65, 0.7, 0.75, 0.8, 0.85, 0.9, 0.92, 0.95, or 0.99, and can be in the range between the two values exemplified herein.

Filament 1 can be formed by performing multilayer extrusion of the material of the core 2 and the material of the covering layer 3.

2. Constitution of Structural Body 5 and Manufacturing Method

As shown in FIG. 2 to FIG. 6, the structural body 5 of an embodiment according to the present invention comprises an adherend 4, and a shaping pattern 6 to change the shape of the adherend 4. The shaping pattern 6 is formed with the afore-mentioned filament 1, and the covering layer 3 of the filament 1 is welded with the adherend 4.

The material of the covering layer 3 is a material which is easily welded with the adherend 4 than with the material of the core 2. When the core 2 is covered with such material, the welding characteristics of the filament 1 with the adherend 4 can be improved.

In addition, when expressed with the Hansen solubility parameter (hereinafter referred to as SP value), the SP value of the material of the surface of the adherend 4 is taken as SPbase, the SP value of the material of the covering layer 3 is taken as SPcover, and the SP value of the material of the core 2 is taken as SPcore. When $\Delta$SPcover and $\Delta$SPcore are defined by formulas (1) and (2), the relation of formula (3) is preferably satisfied. That is, the absolute value of the difference between the SP values of the adherend 4 and the covering layer 3 is preferably smaller than the absolute value of the difference between the SP values of the adherend 4 and the core 2.

By covering the core 2 with such material, the welding characteristics of the filament 1 with the adherend 4 can be improved. The value of $\Delta$SPcore–$\Delta$SPcover is preferably 0.1 or larger, and is for example, 0.1 to 10. Specific value of $\Delta$SPcore–$\Delta$SPcover is, for example, 0.1, 0.2, 0.3, 0.4, 0.5, 0.6, 0.7, 0.8, 0.9, 1, 2, 3, 4, 5, 6, 7, 8, 9, or 10, and can be larger than any one of the values exemplified herein, or in the range between the two values exemplified herein.

$$\Delta SPcover = |SPcover - SPbase| \quad (1)$$

$$\Delta SPcore = |SPcore - SPbase| \quad (2)$$

$$\Delta SPcover < \Delta SPcore \quad (3)$$

Further, the relation of formula (4) is preferably satisfied. That is, the absolute value of the difference between the SP value of the adherend 4 and covering layer 3 is preferably 1.3 or lower. In such case, the covering layer 3 would be welded with the adherend 4 strongly. Value of $\Delta$SPcover is preferably 1.0 or lower, and more preferably 0.5 or lower. Specific example of the value of $\Delta$SPcover is 0, 0.1, 0.2, 0.3, 0.4, 0.5, 0.6, 0.7, 0.8, 0.9, 1, 1.1, 1.2, or 1.3, and can be in the range between the two values exemplified herein. The surface of the adherend 4 and the covering layer 3 are preferably formed with the same material.

$$\Delta SPcover \leq 1.3 \quad (4)$$

Figure 2:
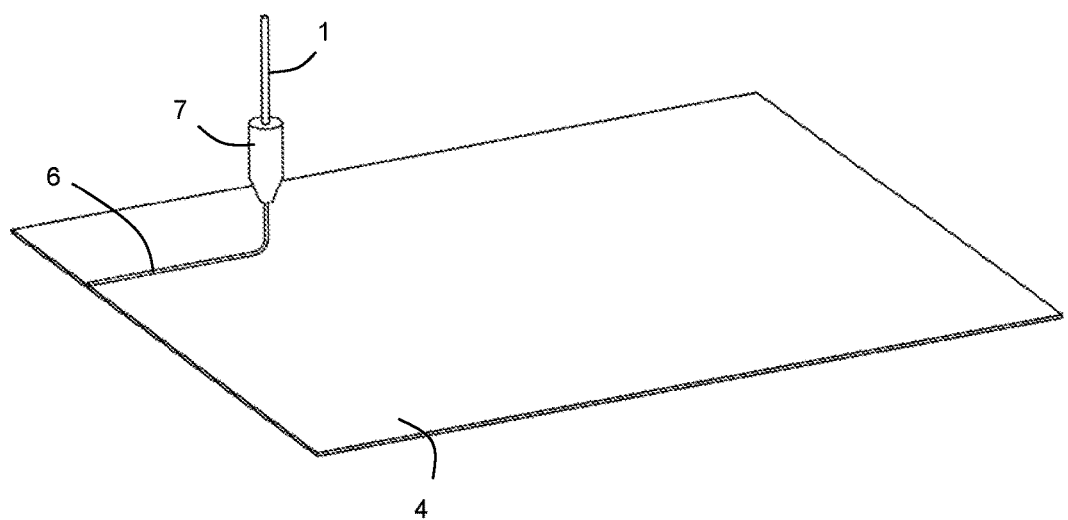
FIG. 2 shows a perspective view of a manufacturing process of structural body 5 according to an embodiment of the present invention.

The method for forming the shaping pattern 6 is not particularly limited and a suitable method is selected depending on the type of the shape memory material. For example, when the material of the core 2 is the shape memory polymer, and the material of the covering layer 3 is a thermoplastic resin, the shaping pattern 6 can be formed by using a thermofusion 3D printer. In one example, as shown in FIG. 2, the filament 1 is inserted in the head 7, and the filament 1 undergoes melt extrusion from the head 7 in a condition where the core 2 is covered with the covering layer 3, followed by welding the covering layer 3 to the adherend 4, thereby forming the shaping pattern 6. With such method, the shaping pattern 6 can be formed easily. When the radius of the filament 1 before being inserted into the head 7 is taken as Rbefore, and the radius of the filament 1 after being extruded from the head 7 is taken as Rafter, the value of Rafter/Rbefore is preferably 0.1 to 1. Specific value of Rafter/Rbefore is, for example, 0.1, 0.2, 0.3, 0.4, 0.5, 0.6, 0.7, 0.8, 0.9, or 1, and can be in the range between the two valued exemplified herein. In order to improve the accuracy of the shaping pattern 6, the value of Rafter is preferably kept small. However, when the value of Rafter is small, the covering layer 3 would accordingly be thin, thereby deteriorating the welding characteristics with the adherend 4. Rafter is, for example, 0.1 to 0.5 mm. Specific example of Rafter is, 0.1, 0.2, 0.3, 0.4, and 0.5 mm, and can be in the range between the two values exemplified herein.

The distance between the tip of the head 7 and the adherend 4 is, for example, 0.1 to 1 mm, and is specifically for example, 0.1, 0.2, 0.3, 0.4, 0.5, 0.6, 0.7, 0.8, 0.9, or 1 mm, and can be in the range between the two values exemplified herein.

Figure 3:
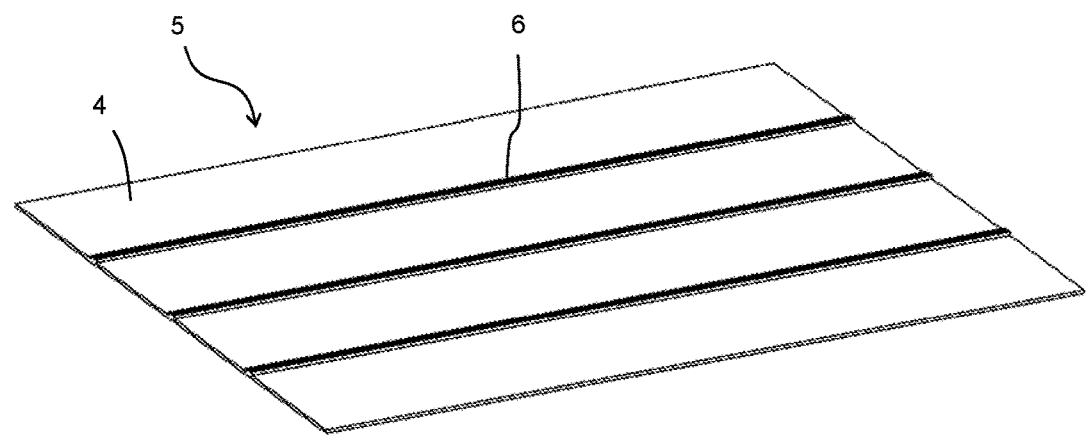
FIG. 3 shows a perspective view of structural body 5 according to an embodiment of the present invention, in a condition where shaping pattern 6 is in an original form.
Figure 4:
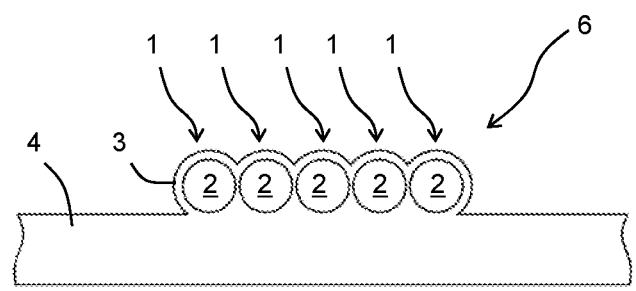
FIG. 4 shows an enlarged view of the vicinity of the end face of shaping pattern 6 of structural body 5 in FIG. 3.

The shaping pattern 6 can be constituted with one filament 1, or can be, as shown in FIG. 3 and FIG. 4, constituted by welding a plurality of (5 filaments in the Figure) filament 1 in the width direction. The plurality of filament 1 are welded with each other by the covering layer 3, and thus the welding strength is high. The number of filament 1 constituting the shaping pattern 6 in the width direction is 1 to 30 filaments for example, and is specifically for example, 1, 5, 10, 15, 20, 25, or 30 filaments, and can be in the range between the two values exemplified herein.

Figure 5A:
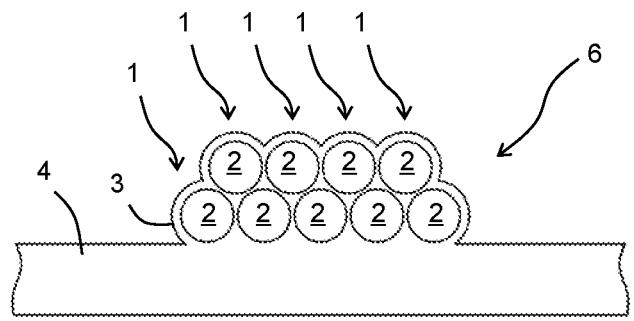
FIG. 5A shows a variation example of FIG. 4.
Figure 5B:
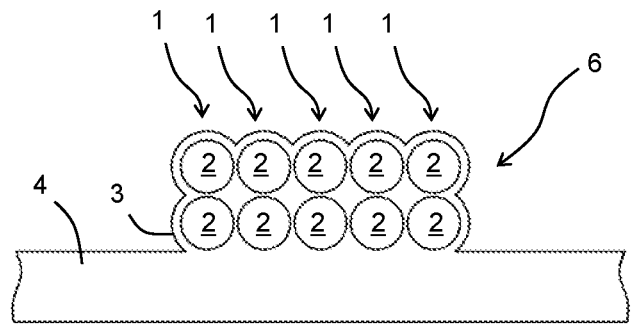
FIG. 5B shows a variation example of FIG. 4.

In addition, in FIG. 3 and FIG. 4, the shaping pattern 6 is constituted with one layer of filament 1. However, as shown in FIG. 5A and FIG. 5B, the shaping pattern 6 can be constituted with a plurality of layers of filament 1. The plurality of layers of filament 1 can be constituted so that a core 2 of an upper layer is placed in between two core s 2 of a lower layer, as shown in FIG. 5A. Otherwise, as shown in FIG. 5B, the core 2 of the upper layer can be placed above the core 2 of the lower layer. The number of layers of filament 1 constituting the shaping pattern 6 is, for example, 1 to 30 layers, and is specifically for example, 1, 3, 5, 10, 15, 20, 25, or 30 layers, and can be in the range between the two values exemplified herein.

In the present embodiment, adherend 4 is in a sheet form such as woven fabric, non-woven fabric, and film. The material of the adherend 4 is not particularly limited, and polyolefin such as polyethylene and polypropylene, polyester such as PET, polyurethane, and fluorine resin can be mentioned. The adherend 4 can be formed with natural fibers such as cotton, hemp, silk, and wool.

The shaping pattern 6 can be provided only on one side of the adherend 4, or can be provided on both sides. The ratio of the area where the shaping pattern 6 is welded with respect to the entire surface area of the adherend 4 is 1 to 80%, preferably 10 to 50%, and is specifically for example, 1, 5, 10, 15, 20, 25, 30, 35, 40, 45, 50, 55, 60, 65, 70, 75, or 80%, and can be in the range between the two values exemplified herein.

3. Method of Using Structural Body 5

Here, method of using structural body 5 will be explained by taking a case where the material of the core 2 is a shape memory polymer (Tg: 55° C.) as an example.

As shown in FIG. 2 and FIG. 3, when a linear shaping pattern 6 is formed in a condition where the adherend 4 is flat, the original form is set as the condition shown in FIG. 3. When the temperature of the shaping pattern 6 is below Tg, the elasticity rate of the shape memory polymer is large (difficult to deform), and thus the shaping pattern 6 would not deform easily. Therefore, the shape of the adherend 4 is maintained flat.

Figure 6:
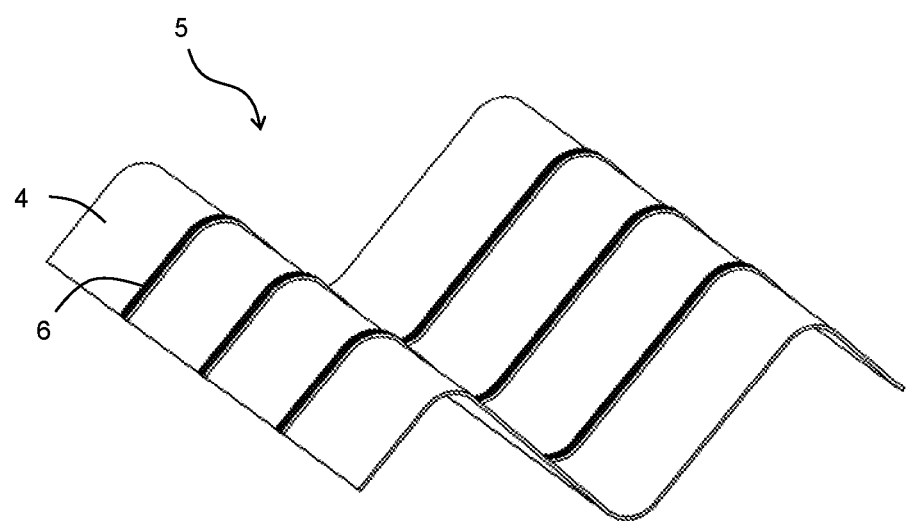
FIG. 6 shows a perspective view of structural body 5 according to an embodiment of the present invention, in a condition where shaping pattern 6 is in a secondary shape.

Next, when the shaping pattern 6 is heated to a temperature at or above Tg, the elasticity rate of the shape memory polymer is decreased largely, thereby allowing to deform the shaping pattern 6 freely into a secondary shape. For example, as shown in FIG. 6, when the shaping pattern 6 is deformed into a corrugated sheet shape, and then the shaping pattern 6 is cooled to a temperature below Tg while maintaining such shape, such shape is maintained. Since the shaping pattern 6 is welded to the adherend 4, the shape of the adherend 4 would also be deformed into a corrugated sheet shape.

When the shaping pattern 6 is heated to a temperature at or above Tg while applying no external force, the shaping pattern 6 would recover its original form (linear form), and turns into a condition shown in FIG. 3. Accordingly, the adherend 4 would also recover the planar shape.

As explained, in the structural body 5, since the shaping pattern 6 having the shape memory characteristics is welded to the adherend 4, the adherend 4 can also exhibit the shape memory characteristics.

In the present embodiment, the condition in which the adherend 4 has a planar shape is taken as the original form of the shaping pattern 6, however, a condition in which the adherend 4 has a three-dimensional shape such as cylinder or bent shape can be taken as the original form of the shaping pattern 6. In addition, in the present embodiment, the shaping pattern 6 has a linear shape, however, the shaping pattern 6 can have an arbitrary shape such as a curved shape, a zigzag shape and a lattice shape.

As a specific example of the structural body 5, articles such as clothes, tents, yacht sails, seating surfaces, and shoes can be mentioned. When the user cannot be satisfied with the shape of a ready-made article, the user can deform such article into a shape of their preference. Then, when the shape of their preference becomes unnecessary, such articles can be returned to its original shape by merely heating the article to a temperature at or above its recovery temperature.

4. Other Embodiments

In the afore-mentioned embodiments, the filament 1 was inserted into the head 7 to form the shaping pattern, however, without using the filament 1, the material of the core 2 and the material of the covering layer 3 can be melt separately and combined in the head 7, followed by melt extrusion of the covering layer 3 and the core 2 from the head 7 so that the covering layer 3 covers the core 2, thereby forming a multi-layer structure similar to that of filament 1. In such case, the material of the core 2 and the material of the covering layer 3 can be each linear, or can have a different form such as pellets.

The core 2 can be formulated with a filler such as cellulose nanofiber.

EXPLANATION OF SYMBOLS

1: filament, 2: core, 3: covering layer, 4: adherend, 5: structural body, 6: shaping pattern, 7: head

The invention claimed is:

1. A structural body, comprising: an adherend and a filament comprising a linear core and a covering layer covering the core; wherein the core is formed with a shape memory material; the covering layer is formed with a material different from the material of the core and wherein the covering layer of the filament is welded to the adherend in a pattern; said pattern configured so that when the shape memory material is activated said activation results in a change in the shape of the adherend.

2. The structural body of claim 1, wherein the material of the covering layer is a material which is more easily welded to the adherend than to the material of the core.

3. The structural body of claim 1, wherein when a Hansen solubility parameter (SP) value of a material of a surface of the adherend is taken as SPbase, SP value of a material of the covering layer is taken as SPcover, and SP value of a material of the core is taken as SPcore; and when ASPcover and ASPcore are defined by formulas (1) and (2), relation of formula (3) is satisfied, $$\Delta SPcover = |SPcover - SPbase| \quad (1)$$

$$\Delta SPcore = |SPcore - SPbase| \quad (2)$$

$$\Delta SPcover < \Delta SPcore \quad (3)$$

4. The structural body of claim 3, wherein a relation of formula (4) is satisfied, $$\Delta SPcover < 1.3 \quad (4)$$

5. A method for manufacturing a structural body using a thermofusion 3D printer, comprising the steps of: a shaping pattern forming step to form a shaping pattern on an adherend; wherein: in the shaping pattern forming step a covering layer and a core are melt extruded from a head so that the covering layer covers the core, and the covering layer is welded to the adherend to form the shaping pattern; the core is formed with a shape memory polymer; and the covering layer is formed with a thermoplastic resin other than a material of the core; wherein the shaping pattern is configured such that when activated the shape memory polymer changes the shape of the adherend.

6. The method of claim 5, wherein the core and cover comprise a filament that is inserted into the head, and the filament is melt extruded from the head in a condition where the covering layer is covering the core.

* * * * *